United States Patent
Gogolla

(10) Patent No.: US 8,727,612 B2
(45) Date of Patent: May 20, 2014

(54) IMAGING MEASURING SYSTEM AND MEASURING METHOD FOR MEASURING THERMAL OUTPUT TO A TARGET OBJECT

(75) Inventor: Torsten Gogolla, Schaan (LI)

(73) Assignee: Hilti Aktiengesellschaft, Schaan (LI)

( * ) Notice: Subject to any disclaimer, the term of this patent is extended or adjusted under 35 U.S.C. 154(b) by 169 days.

(21) Appl. No.: 13/483,898

(22) Filed: May 30, 2012

(65) Prior Publication Data

US 2012/0307859 A1    Dec. 6, 2012

(30) Foreign Application Priority Data

May 30, 2011  (DE) .......................... 10 2011 076 680

(51) Int. Cl.
*G01J 5/00*     (2006.01)
*G01K 15/00*    (2006.01)

(52) U.S. Cl.
USPC ............................................. 374/121; 374/1

(58) Field of Classification Search
USPC ..................................... 374/121, 1
See application file for complete search history.

(56) References Cited

U.S. PATENT DOCUMENTS

| | | | | |
|---|---|---|---|---|
| 2011/0096148 | A1* | 4/2011 | Stratmann | 348/46 |
| 2012/0307859 | A1* | 12/2012 | Gogolla | 374/1 |
| 2013/0162796 | A1* | 6/2013 | Bharara et al. | 348/77 |

* cited by examiner

*Primary Examiner* — Lisa Caputo
*Assistant Examiner* — Jamel Williams
(74) *Attorney, Agent, or Firm* — McAndrews, Held & Malloy, Ltd.

(57) ABSTRACT

An imaging thermographic measuring system to measure the thermal output ($Q_{out}$) at a target object, such as a building wall, building facade, or the like, comprising a measuring station provided for the arrangement distant from the object with an electric imaging device to record a thermographic thermal image, with a temperature distribution to be allocated thereto, and with a temperature sensor distant from the object to measure a temperature ($T_{ref}$) distant from the object; at least one thermal transition sensor provided to be arrange close to the object, a transmission arrangement to transmit values between at least one thermal transition sensor and the measuring station, with the thermal transition sensor being embodied to predetermine the test values to determine a thermal transition coefficient (h).

20 Claims, 5 Drawing Sheets

(A)

(B)

IMAGING MEASURING SYSTEM AND MEASURING METHOD FOR MEASURING THERMAL OUTPUT TO A TARGET OBJECT

CROSS-REFERENCE TO RELATED APPLICATIONS

The present application claims priority to German Patent Application DE 10 2011 076 680.4, filed May 30, 2011, and entitled "Bildgebendes Mess system and Messverfahren zur Messung einer Warmeabgabe an einem Zielobjekt" ("Imaging Measuring System and Measuring Method for Measuring Thermal Output at a Target Object"), which is hereby incorporated by reference in its entirety.

BACKGROUND OF THE INVENTION

The present invention generally relates to an imaging measuring system to measure the thermal output at a target object, such as a building wall, a building facade, or the like. Further, the invention relates to a measuring method for measuring the thermal output at the target object.

An imaging measuring system may use a thermal imaging camera, also called thermography camera, which, similar to a conventional electric imaging camera, may receive imaging infrared radiation instead of visible light. The radiation that may be used, due to the typical emission wavelengths of objects in the proximity of the ambient temperature, ranges in the medium infrared wavelengths from 2.5 to 14.0 μm, which is suitable for the measuring and imaging of temperatures in the ambient temperature range. An imaging measuring system using a thermal imaging and/or thermography camera may therefore visualize for the human eye the generally invisible thermal radiation of a target object.

The target object may be any arbitrary body, particularly a building or the like, for example. Here, regularly areas of such target object, for example a building wall, a building facade, or the like, shall be measured in a touchless fashion. In particular, a temperature distribution over the surface of a target object may be detected and displayed in a touchless fashion, whereby generally even relatively far-distanced, larger objects may be displayed. In particular the determination of heat loss is one of many applications of thermography. Imaging thermographic measuring systems of prior art are helpful for the determination of a general temperature distribution, however regularly they only show a qualitative value of energy loss and/or thermal output, i.e. particularly only a qualitative distribution thereof at the target object. Unless particular environmental conditions, such as appropriate weather conditions and perhaps relatively long-lasting constant conditions, are given at the target object without any disturbances or the like, as described in the article of Dittié"Environmental influences for the precision of the thermography of buildings" in the thermography congress 2007, lecture 01, only a conditional quantitative and flawed conclusion may be drawn concerning the thermal output and/or the distribution of thermal output at a target object.

BRIEF SUMMARY OF THE INVENTION

One or more embodiments of the present invention provide a thermographic imaging measurement system and method measuring the thermal output ($Q_{out}$) at a target object, such as a building wall. The thermographic system includes a measuring station provided for the arrangement distant from the object with an electric imaging device to record a thermographic thermal image, with a temperature distribution to be allocated thereto, and with a temperature sensor distant from the object to measure a temperature ($T_{ref}$) distant from the object; at least one thermal transition sensor provided to be arrange close to the object, a transmission arrangement to transmit values between at least one thermal transition sensor and the measuring station, with the thermal transition sensor being embodied to predetermine the test values to determine a thermal transition coefficient (h).

BRIEF DESCRIPTION OF THE DRAWINGS

Additional advantages, features, and details of one or more embodiments of the invention are discernible from the following description of the preferred exemplary embodiments as well as the drawing, which shows.

DETAILED DESCRIPTION OF THE INVENTION

Figure 1:
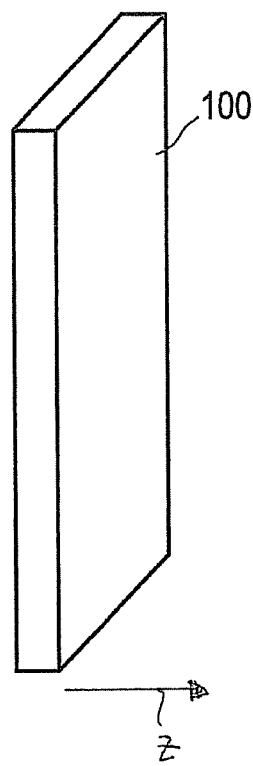
FIG. 1 in a view (A) a schematic illustration of an imaging measuring system to measure at a target object, here a building facade, and in a view (B) a thermographic thermal image of the imaging measuring system according to prior art.
Figure 1:
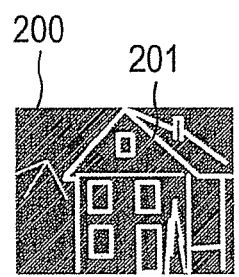
Figure 1:
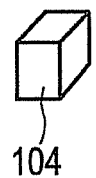

One or more embodiments of the present invention provide a principally more reliable, particularly also quantitative statement concerning the thermal output, particularly a distribution of said thermal output, at a target object.

Further, one or more embodiments of the present invention provide a device and a method with which, in an improved manner a more reliable, particularly an also quantitative measurement of the thermal output at a target object, particularly a quantitative measurement of the distribution of the thermal output at a target object, is possible. In particular, a measurement is preferably provided relatively independent from the environmental conditions. In particular, it is preferable to provide the at least part of the information for a single image of a thermographic thermal image in order to allow a reliable, approximated quantitative statement concerning the thermal output, particularly the distribution of the thermal output at a target object.

With regard to the device, the objective is attained according to one or more embodiments of the invention by an imaging thermographic measuring system to measure thermal output at a target object according to the manner mentioned above. With regard to the method, the objective is attained according to one or more embodiments of the invention by a method of the type mentioned above.

One or more embodiments of the invention are based on the thought that by using a thermographic thermal image as well as additional measurements it is generally possible, at least approximately, to render a quantitative statement concerning the thermal output, particularly the distribution of thermal output at a target object, independent from the environmental conditions. One or more embodiments of the invention are further based on the thought that particularly hard to assess convective disturbing influences have previously aggravated any quantitative determination of the thermal output, independent from the environmental conditions. One or more embodiments of the invention have recognized that particularly convective influences may be considered by a thermal transition coefficient and the thermal transition coefficient may be determined relatively simply, at least approximated. One or more embodiments of the invention have recognized that a thermal transition coefficient may be determined by an imaging measuring system, at least approximated, which comprises a measuring station to be arranged distant from the object and a thermal transition sensor provided for arrangement close to the object. According to one or more embodiments of the invention the measuring station comprises an electric imaging device to record a thermographic thermal image, with a temperature distribution being allocated thereto, particularly by way of pixels. The device may comprise for example a bolometer or the like. Using said imaging device, a thermography of a target object may be prepared. The measuring station may use a connection with the thermal transition sensor embodied for the transmission of measurements in an inventive fashion, in order to yield measurements in addition to the thermoelectric thermal image, allowing the determination of quantitative statements concerning the thermographic thermal image. Preferably it is possible to state thermal output, particularly a distribution of thermal output, at a target object.

According to one or more embodiments of the invention it is provided that the measuring station comprises a temperature sensor, distanced from the object, to measure the temperature distant from the object. The thermal transition sensor is designed according to one or more embodiments of the invention to provide test values to determine a thermal transition coefficient.

Overall, one or more embodiments of the invention provide for a thermal transition sensor for a measuring station, by which test values for the determination of a thermal transition coefficient essential for the quantitative thermal output may be predetermined. One or more embodiments of the invention have recognized that a thermal transition coefficient in the area of the thermal transition sensor may be stated in a suitable fashion and thus a quantitative thermal output is possible using the thermographic thermal image.

One or more embodiments of the invention combine a number of advantages in reference to methods of prior art, which are based on the quantitative determination of a thermal output at a target object. In general, quantitative thermal output, particularly the thermal distribution at a target object, may be determined; ultimately this way the overall amount of loss or the distribution of loss, for example at building facades or similar surfaces of target objects may be determined. For this purpose, the imaging measuring system and the method according to the concept of one or more embodiments of the invention generally requires no additional statements concerning the target object itself. These are generally unknown. In particular, generally the thermal conductivity and the thickness of walls of a target object as well as the interior temperature of the target object, for example a building or the like, are usually unknown or are so heterogeneous that they are hard to consider. However, one or more embodiments of the invention offer an imaging measuring system and a method by which a quantitative thermal output may be determined, namely only by way of measurements of relatively easily determined test values, particularly the temperatures and test values outside the object which may be measured and/or determined or are known. This allows a particularly easy and quantitative determination of a thermal output without requiring any detailed information about the target object.

Advantageous further developments of one or more embodiments of the invention are discernible from the dependent claims and show in detail advantageous options to implement the above-described concept within the scope of the objective as well as regarding additional advantages.

Particularly preferred, test values at a test body of the thermal transition sensor comprise predetermined parameters, particularly a thermal conductivity (K) and thickness measurement (L), particularly additionally a thermal emission (c) at the test body. Preferably the test body is a part of a thermal transition arrangement and in a structural unity with a temperature sensor to measure a first temperature $(T_A)$ close to the object at the thermal transition sensor to determine a thermal transition coefficient (h), with the thermal transition arrangement further comprising, in addition to the test body:
  a heat source with a known thermal flow density $(q_I)$ at least on the back and/or the inside of the test body, which may face the target object,
  at least another temperature sensor, at least on a back, and/or inside of a test body which may face the target object to measure a second temperature $(T_I)$ near the object.

In particular, the thermal transition sensor may show a temperature sensor to measure a first temperature close to the object. Additionally or alternatively the thermal transition sensor provides the thermal transition arrangement by which the test values may be preset in order to determine a thermal transition coefficient. In particular, more than one temperature and/or thermal transition sensor may be provided. An advantageous distribution of a number of sensors is possible, for example.

For this purpose, it has particularly been recognized that it is possible to use the thermal transition sensor for the calibration of a temperature distribution to values of at least one first temperature close to the object. In a particularly preferred further development of the method it is provided here that the thermal transition sensor is also accepted by the imaging device by also recording a thermographic thermal image in the thermographic image, i.e. representing a part of the thermographic thermal image. This way, the first temperature close to the object and measured at the thermal transition sensor, on the one hand, is known per se and, on the other hand, represents a part of the thermographic thermal image. This way, the first temperature close to the object may be allocated to an image pixel of the thermal image; this circumstance may be used advantageously for calibrating the entire temperature distribution with a pixel-related allocation of temperatures in the thermal image.

In a particular further development of one or more embodiments of the invention the measurement process comprises the additional steps:
  pixel-related allocating of the thermographic thermal image to the temperature distribution under calibration thereof for values of at least one first temperature close to the object,
  determining a thermal transition coefficient via at least one test value, and
  quantitatively stating the thermal output by using the thermal transition coefficient, the calibrated temperature distribution, and the temperature distant from the object, as well as an illustration scale of the thermoelectric image.

The above-mentioned further developed concept may be used for an imaging measuring system with a computer. The computer is advantageously embodied to calibrate the pixel-related allocated temperature distribution to values of at least one temperature close to an object and at least to determine a thermal transition coefficient via the test values. In particular, the computer is further embodied to use the temperature distribution calibrated from the thermal transition coefficient and the temperature distant from the object as well as an imaging scale of the thermoelectric image in order to state quantitatively a thermal output. Additionally or alternatively the computer is preferably embodied to determine the thermal transition coefficient via at least the test values.

Within the scope of a particularly preferred further development the computer is embodied such that the thermal transition coefficient is determined by the temperature distant from the object and the first temperature close to the object. Here the synergetic use of the temperature measured distant from the object by the temperature sensor distant from the object as well as the first temperature close to the object measured by the temperature sensor close to the object is beneficial for the determination of the thermal transition coefficient.

Within the scope of a preferred further development the measuring station comprises a distant measuring device for a touchless measuring of a distance. In particular a distance between a reference point and at least one measuring point at the target object may be measured touchlessly, particularly by sonar logging using working beams. The distance between the reference point and the measuring point may quickly and exactly be determined, particularly also in an aggravated or impossible accessibility of a territory covered by the distance. Preferably the computer is formed in order to determine from the distance a focus length, and a pixel area of the thermographic image of the imaging scale. By this technically calculated determination of the imaging scale using the direct determination of the structural dimensions, which usually would have to occur from technical building documents, may be waived. This simplification saves time and money.

Particularly preferred, the thermal transition sensor comprises a test body, with the temperature sensor being arranged at least at a front of a test body that may face the measuring station for measuring a first temperature close to the object. The provision of a test body provides a constructive advantage such that a defined arrangement of the temperature sensor close to the object is possible and the temperature measured by the temperature sensor close to the object is identical to the front of the test body that may face the measuring station.

In particular, a thermal transition arrangement is formed at the test body such that the test values may be preset and/or set in order to determine a thermal transition coefficient at the test body. Here, the test body is advantageously used indirectly to determine a thermal transition coefficient. In particular, the test body comprises known test values of thermal conductivity and the thickness, in particular additional thermal emission. Here, the constructive as well as material-technological features of the test body may be predetermined in a defined manner; thus they advantageously replace the largely unknown features of the target object.

Preferably the thermal transition arrangement of the thermal transition sensor comprises a heat source with a known thermal flow density at least at the back and/or inside of a test body that may face the target object. The introduction of a known thermal flow density within the scope of the described arrangement allows the more precise determination of the thermal transition coefficient based on quantitatively known parameters.

Within the scope of a further developed variant it is provided that the thermal transition arrangement of the thermal transition sensor comprises at least one additional temperature sensor, at least on a rear and/or interior of a test body that may face the target object to measure a second temperature close to the object. Additionally or alternatively to the above-described arrangement with a heat source with a known thermal flow density, a thermal behavior may also be determined in a variant by the introduction of a second temperature close to the object. This way the expense for defining a stable thermal flow density is reduced beneficially.

Within the scope of a preferred further development the imaging measurement system provides a display unit, by which the calibrated temperature distribution may be shown. Additionally or alternatively an input unit is provided for entering test values. The illustration of a calibrated temperature distribution facilitates the qualified statements with regard to technical measures for the structure.

Within the scope of a particularly preferred constructive further development the measuring station comprises a housing with the imaging device, the temperature sensor distanced from the object, and a transceiver part of the transmission arrangement being located therein, particularly additionally the computer and perhaps a display unit and/or input unit. In the practical application for buildings the set-up period required is reduced here. The measuring station may be compactly located in the housing and said housing then protects from undesired influences, such as moisture, dirt, and the like, which are present in the practical application for buildings.

Within the scope of a preferred variant the test values for the determination of a thermal transition coefficient may be determined using an ultrasound measuring unit. The ultrasound measuring unit implements an alternative principle for the determination of convective influences. This is particularly advantageous for structured surfaces at which a complex flow structure may develop.

In the following, exemplary embodiments of one or more embodiments of the invention are explained using the drawing. They shall not necessarily illustrate the exemplary embodiments to scale, but rather the drawings, when serving explanatory purposes, are prepared in a schematic and/or representative form. With regard to additions to the teaching directly discernible from the drawing, reference is made to the respective prior art. Here it must be considered that multiple modifications and changes with regard to form and details of an embodiment may be made without leaving the general concept of one or more embodiments of the invention. The features of one or more embodiments of the invention disclosed in the description, the drawing, as well as the claims may be used for the further development of one or more embodiments of the invention both individually as well as in any combination. Additionally, the scope of one or more embodiments of the invention also covers any and all combinations of at least two features disclosed in the description, the drawing, and/or the claims. The general idea of one or more embodiments of the invention is not limited to the precise form or the detail of the preferred embodiment shown and described in the following or restricted to the object. The measuring ranges stated shall also be arbitrarily applicable and claimed within the above-mentioned values disclosed as limits. For reasons of simplification, in the following, identical or similar parts or parts with an identical or similar function are marked with the same reference character.

FIG. 1 shows in view (A), as an example, a common situation in imaging thermographic measurements of a thermal output at a target object 100, which here is shown in the form of a building facade. Using only the thermal image camera 104, a thermographic thermal image 200 is recorded shown symbolically in the view (B). The thermographic thermal image 200 provides important information concerning the temperature distribution 201 on the target object 100 in the form of color shades or the like in order to allow the locating of poorly insulated areas, such as windows or the like. For this purpose the temperature distribution 201 is very helpful, however generally only a qualitative value may be indicated, comparing locations with relatively high energy loss and/or locations with relatively low energy loss at a target object 100. The background here is that, the measurement in the bolometer of the thermal imaging camera 104 is indeed generally relatively precise, however any thermal radiation S reaching the thermal imaging camera 104 via a distance in the z-direction perpendicularly in reference to the target object 100 perhaps represents only a portion, particularly regularly with regard to the source location falsifying fraction of the thermal radiation, which was actually emitted from the target object 100. This is caused by climate conditions, such as wind direction, humidity, and similarly dependent convective thermal dissipation at the distance between the target object 100 and the thermal imaging camera 104. For example, it has been shown that the thermal radiation at the surface of the target object 100 reaching the thermal imaging camera 104, thus at the source, already largely depends on the wind speed and the wind direction in reference to the surface of the target object 100 as well as the angle of the wind from the surface of the target object 100 to be analyzed.

Furthermore, in order to determine the actual thermal output emitted from the inside of the target object 100 through the above-mentioned surface of the target object 100 additional information is required concerning the surface of the target object 100. Such information is regularly not available for the applicant when recording the thermal image 200 using a simple thermal imaging camera 104.

Figure 2:
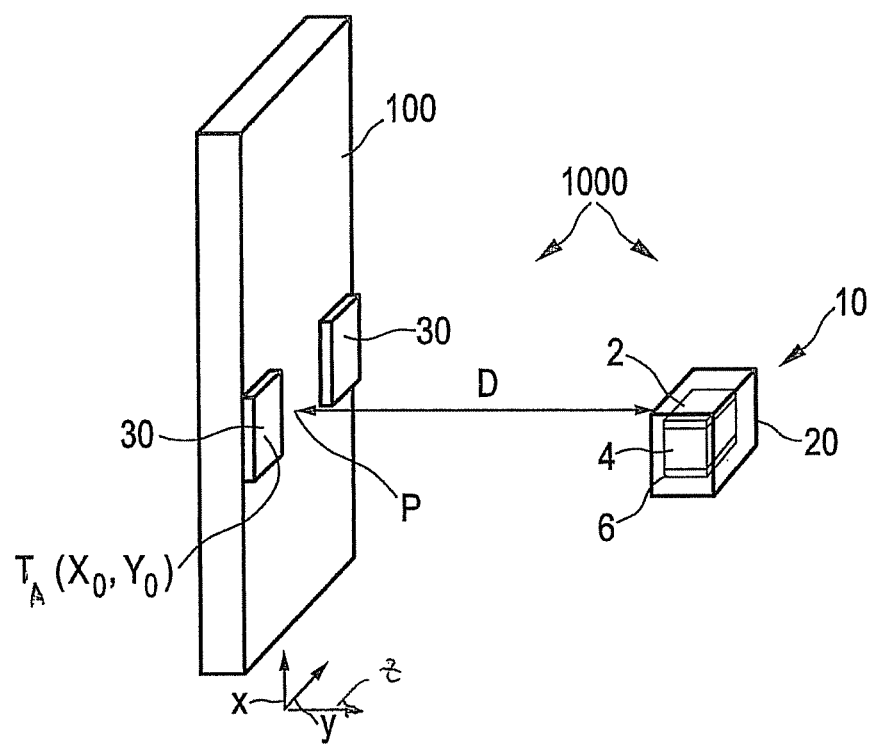
FIG. 2 a schematic illustration of a preferred embodiment of an imaging measuring system comprising two thermal transition sensors and the measuring station.

Following the concept of one or more embodiments of the invention it has been recognized that a quantitative determination of any energy loss, e.g., through the exterior wall of a building or a similar surface of a target object 100, is possible using the imaging thermographic measuring system 1000 shown in FIG. 2. The measuring system 1000 according to one or more embodiments of the invention provides in the present embodiment a measuring station 10, arranged distant from the object, and in this embodiment two thermal transition sensors 30, provided for an arrangement close to the object. The only exemplary illustration shows that the imaging measuring system 1000 may comprise particularly a number of thermal transition sensors 30 distributed in an appropriate manner over the target object 100. Depending on the requirements, the density of the thermal transition sensors 30 at the target object 100 may be adjusted advantageously by their number and distance. In order to realize the concept of one or more embodiments of the invention a single thermal transition sensor 30 may also be suitable at the target object 100 together with the measuring station 10.

In detail, FIG. 2 shows the measuring station 10, with an electric imaging device 4, being arranged in its housing 20 to record a thermographic thermal image, for example in the form of a bolometer or the like. The device 4 in the form of a thermal imaging camera comprises a lens made from germanium, displaying a thermal image as shown in FIG. 1, for example, on a bolometer chip array. The bolometer chip array here performs the function of a CCD chip of conventional cameras. The number of pixels of present-day bolometer arrays range from 160×120 to 640×480. The image of the bolometer array is processed and displayed on a display, not shown in greater detail, at the housing 20 of the measuring station 10. Here, a device 4 of the measuring station 10 of FIG. 2 is used for the display in a false-color illustration of the temperature distribution, in which different colors represent different temperatures.

The imaging thermographic measuring system 1000 may be used, particularly in the form shown in FIG. 2, to detect structural defects, for quality assurance, for acceptance of construction work, for detecting thermal bridges, but also to identify mold and fungal infestation. In particular, a measuring system 1000 serves to locate leakages at target objects 100. They may represent, e.g., moist roofs, including flat roofs or facades, or underground installed pipelines. The measuring system 1000 may indirectly also allow statements regarding necessary noise insulation measures by the thermographic thermal image. In general, using the measuring system 1000 according to the concept of one or more embodiments of the invention as shown in FIG. 2, first energy loss may be quantitatively determined at a target object 100. In detail, this may include the location or limitation of restoring measures, e.g., in case of air leakages or damages under plaster. Additionally, the structures at a target object 100 may be detected using energy loss, such as e.g., timber framework, installed pipelines, e.g., in the case of floor heating or water lines or electric cables. In detail, a measuring system 1000 is also suitable to visualize and prove a thawing point in such and other problem areas of a target object 100.

Without limitations with regard to the application of the embodiment of a measuring system 1000 described in detail in the following, said measuring system 1000 is described based on a quantitative determination of an overall thermal loss at a surface of a target object 100, namely at a building facade of a building. Here, the simple mathematic model underlying the functionality of the measuring system 1000 shall not be understood as a restriction but only represents a preferred, simplified embodiment in order to allow describing the functionality of the measuring system 1000 according to the concept of one or more embodiments of the invention, namely comprising a measuring station 10 distant from the object and a thermal transition sensor 30 close to the object, as an example.

It is already discernible from FIG. 2 that, different from prior art, the measuring station 10 in addition to the electric imaging device 4 also comprises a temperature sensor 6 distant from the object and a touchless distance-measuring device 2. The imaging device 4 for the recording of the thermographic thermal image, the distance-measuring device 2, and the temperature sensor 6 are jointly and compactly arranged in the housing 20 of the measuring station 10. The temperature sensor 6 distanced from the object serves to measure a temperature $T_{ref}$ at the location of the measuring station 10, distanced from the object. In the present case, the distance-measuring device 2 is designed for the touchless measuring of a distance D between a reference point of the distance-measuring device 2, not marked in greater detail, and a measuring point P at the target object 100. For this purpose, the distance-measuring device 2 uses, for example, optic working beams in a modulated form so that by sonar logging the distance D may be determined for a reflected or emitted portion of the measuring radiation. At the location of the measuring station 10 here the distance D and a temperature $T_{ref}$ distanced from the object, and for the target object 100, a temperature distribution T for the surface of the target object 100 are known in reference to the location on the surface. The temperature distribution T particularly also comprises a temperature $T_A$ at the location of a thermal transition sensor 30. The thermal imaging camera first measures only a relative temperature distribution, which via $T_A$ may be calculated into an absolute temperature distribution.

Figure 4:
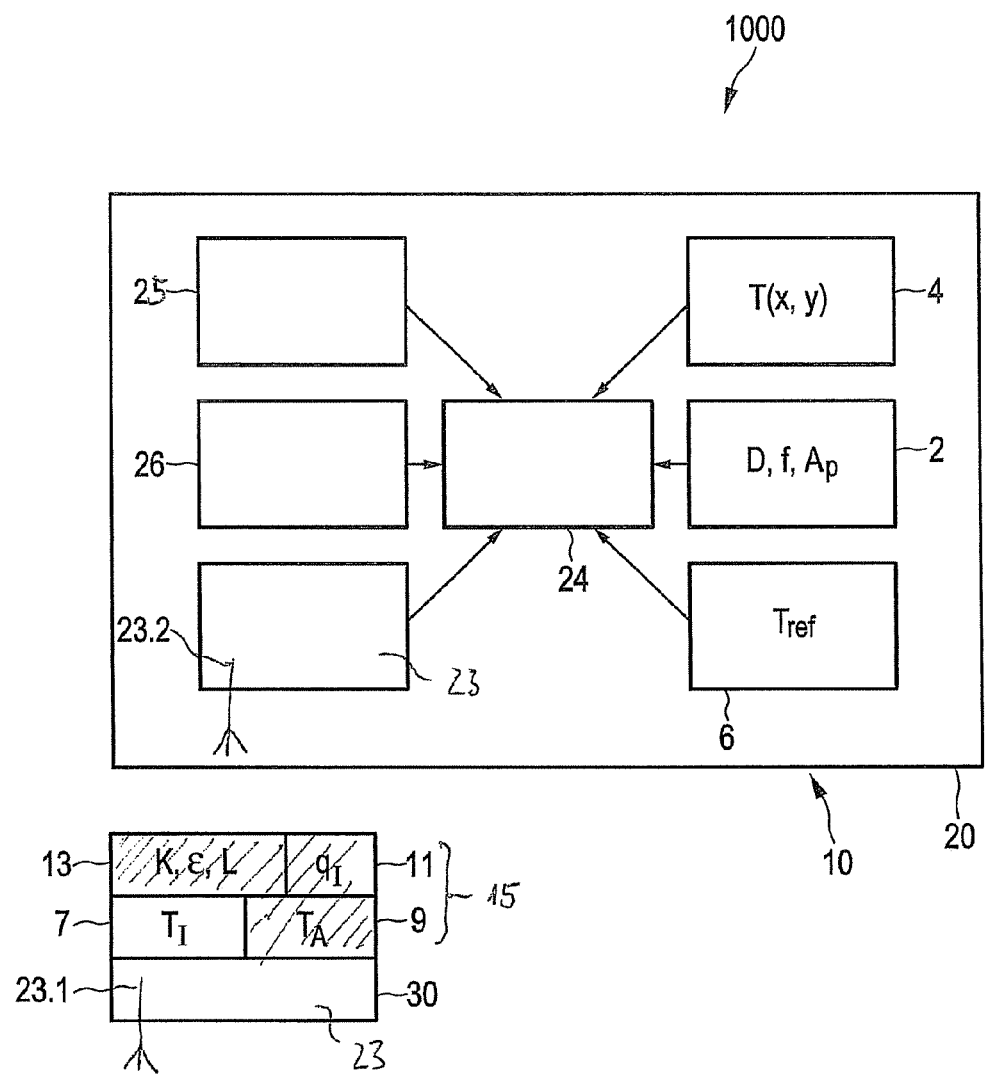
FIG. 4 a schematic illustration of an advantageous design of the imaging measuring system.

Furthermore, at the location of the measuring station 10, the inherent values of a focus length f and a pixel size $A_P$ are also known to the device 4. A display scale may be determined using the distance, the focal length f, and the pixel size $A_P$ by which the coordinates (x, y) of the object level may be allocated to the respective image coordinates in the thermal image. In order to obtain a particularly high precision of this allocation the distance measuring preferably occurs at least approximately perpendicular in reference to the surface, i.e. the distance-measuring beam preferably should be oriented at least approximately at a right angle in reference to the surface of the measuring object. Concretely, a temperature distribution T(x, y) is known depending on the location (x, y) at the surface of the target object 100 as well as the measured temperature $T_A=T(x_0, y_0)$ to be allocated to the thermal transition sensor 30. In the context of FIG. 4 these parameters are explained in greater detail.

In the following, first the above-mentioned simple mathematic model is explained as an example, by which the entire thermal loss through the surface of the target object 100 may be determined among other things using the above-mentioned parameters and/or parameters of the measuring station 10, and of the thermal transition sensor 30. The foundation here is the above-mentioned local temperature distribution T(x, y) of the temperature T at the surface of the target object 100. In order to quantitatively determine the entire thermal loss, it is integrated over the temperature distribution T(x, y) along the location (x, y), with additional measurements and test values being determined or preset by the measuring system 1000 according to one or more embodiments of the invention. Here, test parameters are considered such values available at the thermal transition sensor in a manner that may be predetermined, e.g., here by the features of a test body 13.

Overall, a thermal flow density develops according to $$q_{out}=h*(T_{ref}-T)+\epsilon*\sigma*(T_{ref}^4-T^4) \quad (1)$$

in the unit W/m². The first term describes the heat transport at the surface of the target object 100 by way of convection, while the second term describes the radiation that may be detected by a thermal imaging camera. $\sigma=5.67*10^{-8}$ W/(m²K⁴) marks the Stefan-Boltzmann constant and $\epsilon$ represents the emission level of the surface at the target object 100. The emission level $\epsilon$ depends on the material, the surface condition, the wavelength, however hardly from the temperature T itself. In most cases, the influence of the temperature upon the emission level $\epsilon$ may be disregarded for measurements in the temperature range from 0° C. to 100° C., which one or more of the present embodiments essentially assume. Other varied embodiments may consider this term, though. However, in general many substances in the average infrared range show an emission level $\epsilon$ close to the value 1, almost independent from the wavelength. Here, examples are glass, mineral substances, paints and stains of any color, anodic oxidation coats of any color, plastic materials except polyethylene, wood, and other construction material, water, and ice—thus materials used in construction and supplementary industries. One or more embodiments of the present embodiment therefore assume for the emission level $\epsilon$ an average value of 0.94. Between white and black surfaces $\epsilon$ varies slightly in the range of 0.9-0.98, however this is considered secondary with regard to the explanation of the principle of the embodiment.

Relevant for the other quantitative determination of the entire thermal loss at the surface of the target object 100, in the present case the thermal transition coefficient h, concretely also the convection thermal transportation coefficient $\alpha$ is mentioned, which, e.g., shall be determined at the exterior wall of a building facade. The coefficient, in the following marked thermal transition coefficient h, may largely depend on the wind speed or other environmental influences at the exterior wall of a building facade, thus at a surface of the target object 100. Typical values range from 2 W/(m² K) to 25 W/(m² K). h shall be determined here, at least approximated for a quantitative determination of the entire thermal emission $q_{out}$ at the target object 100. Once h is known, within the scope of the present embodiment, the entire thermal loss by convection may be determined as a thermal loss $$Q_{out} = M^2 * A_p * \sum q_{out,n} \approx \left(\frac{D}{f}-1\right)^2 * A_p * h \sum (T_{ref} - T_n), \quad (2)$$

whereby in a first approximation the thermal loss by radiation is neglected. Here, the present embodiment uses the measurement of the distance D for an area assessment at the surface of the target object 100, namely in order to determine an imaging scale for the thermographic thermal image $$M = \frac{D}{f} - 1 \quad (3)$$

Using the imaging scale, coordinates, distances, and/or areas in the thermal image are allocated to coordinates (x, y), distances and/or areas at the measuring object, at least approximated, whereby the direction of view of the thermal imaging camera, in order to obtain optimized precision, should be aligned perpendicular in reference to the surface of the measuring object, to the extent possible. The entire thermal loss $Q_{out}$ therefore results as a sum and/or integrated value from the thermal flow density, thermographically allocated to each pixel, multiplied with the wall area $A_p*M^2$ allocated to each pixel, with n representing the number of pixels of the thermographic thermal image.

According to one or more embodiments of the invention it has been recognized that the thermal transition coefficient h, due to its dependency on weather but also depending on the construction of the facade of the outside of a building, should be measured at a suitable location and/or distributed at suitable locations over the surface of a target object 100. The thermal transition sensor 30, shown in greater detail in FIG. 3, serves for this purpose, which in this form may be mounted as a part of a distribution of a number of such sensors 30 at the target object 100. The measurements determined by the thermal transition sensor 30 and/or known test values may be communicated in the thermal transition sensor 30 and the measuring station 10 by a radio device 23 shown symbolically in FIG. 4.

Figure 3:
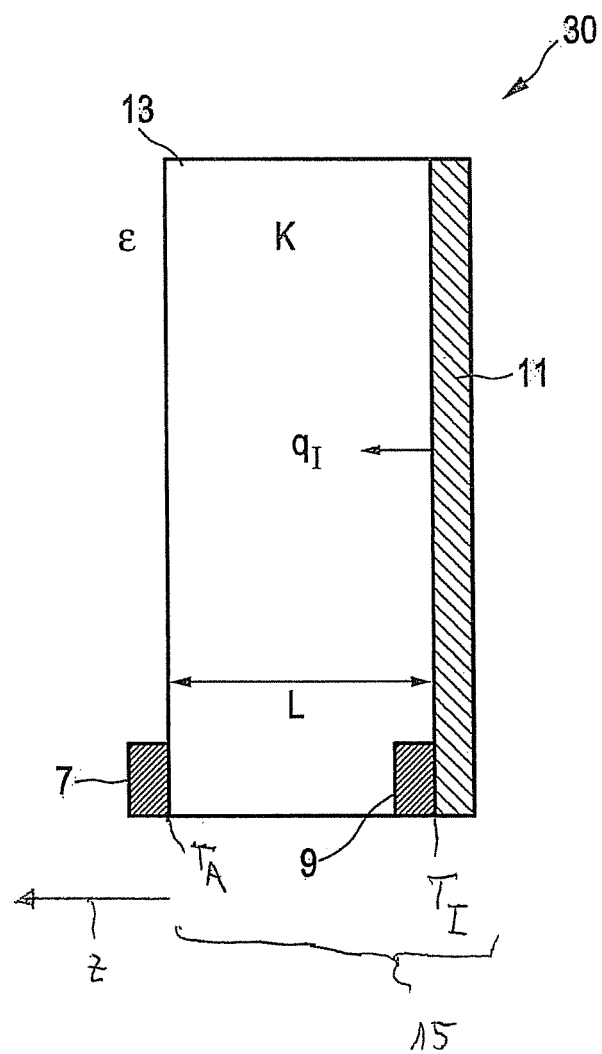
FIG. 3 a schematic illustration of a thermal transition sensor of FIG. 2.

In detail, FIG. 3 shows a detailed schematic illustration of one of the thermal transition sensors 30 of FIG. 2. The thermal transition sensor 30 comprises a second temperature sensor 7 close to the object at the front of a test body 13 facing the measuring station 10 and, as a part of a thermal transition device 15, the test body 13 and a first temperature sensor 9 close to the object at the back of the test body 13 facing away from the measuring station 10. The test body 13 itself shows a thickness L, a thermal conductivity K, and a thermal emission level c; the latter parameters show values also marked as test values.

Furthermore, a heat source 11 is arranged at the back of the test body 13, facing away from the measuring station, as another part of a thermal transition arrangement 15, with its thermal flow density $q_I$ being known. Additionally, the thickness L, the thermal conductivity K, and the emission level $\epsilon$ are known as test values due to the nature of the test body 13. In other words, the test body 13 provides a known material which is used to determine the thermal transition coefficient h according to one or more embodiments of the invention so that a precise knowledge of the surface of the target object 100 is generally not necessary. Following one or more embodiments of the invention, the test body 13 replaces in the thermal transition sensor 30, so to speak, the features of the target object 100 not known.

A simple model of the thermal conductivity, easily implemented via the thermal transition arrangement 15, provides the temperature independence for the test body 13 in FIG. 3

$$T(z) = T_A + \frac{q_I}{K}*(L-z) = -\frac{T_I - T_A}{K}*z + T_I \quad (4)$$

Using $T(L)=T_A$ it follows for the thermal transition coefficient h from the equation (1)

$$h = \frac{q_I - \varepsilon*\sigma(T_A^4 - T_{ref}^4)}{T_A - T_{ref}} \quad (5)$$

Neglecting the thermal radiation ($\varepsilon=0$) and in case the thermal flow rate $q_I$ of the heat source 11 is not precisely known, h may also be determined from measurements of the second temperature $T(0)=T_I$, close to the object, by the second temperature sensor 9, close to the object, as follows $$h = \frac{K*(T_I - T_A)/L}{T_A - T_{ref}} \quad (6)$$

In other words, the thermal transition coefficient h may be determined based on a thermal flow density $q_I$, predetermined or determinable by $T_I$, at the test body 13 and based on the knowledge of the first temperature $T_A$ close to the object and the temperature $T_{ref}$ distant from the object. This model assumes that in a defined heating capacity of the heat source 11 a thermal balance develops in the test body 13 and forms a continuity condition at the surface of the test body 13. This may be characterized by the two temperatures $T_A$ and $T_I$, which may be measured by the two temperature sensors 7, 9 in the manner described above.

Due to the fact that additionally the thermal transition sensor 30 close to the object is mounted at the surface of the target object 100 the same convective influences act upon it as upon the surface of the target object 100, thus for example upon a facade of a building. Due to the fact that on the one hand via the imaging device 4, due to the thermal radiation S, a measured thermal flow density and/or temperature $T(x_0, y_0)$ is known in reference to the temperatures of the other locations recorded by the thermal imaging camera, but on the other hand the first temperature $T_A$ close to the object is measured at the location $(x_0, y_0)$ of the thermal transition sensor 30, by equalizing $T(x_0, y_0)$ and $T_A$ a temperature distribution $T(x, y)$ may be calibrated by $T(x_0, y_0)=T_A$ and thus the distortions caused by the convective influences of the measured temperature $T(x_0, y_0)$ may be eliminated. This way, the temperature distribution is precisely determined according to the given model at the locations $(x_0, y_0)$ and serves as the reference value for the temperature distribution in the thermal image.

In detail, with reference to FIG. 4, the imaging thermographic measuring system 1000 is shown with the thermal transition sensor 30 as well as the measuring station 10 and the respective units in the housing 20. The first units of the thermal transition sensor 30 and the measuring station 10 are allocated to the above-explained measurements and test values of the test body 13. The thermal transition arrangement 15 is shown hatched in FIG. 4.

As explained, the thermal transition sensor 30 comprises the thermal transition arrangement 15, i.e. the test body 13 for presetting the test values K, $\varepsilon$, L known per se and a heat source 11 to preset the defined thermal flow density $q_I$. The thermal transition sensor 30 comprises in the present case also a first temperature sensor 7, close to the object as a part of the thermal transition arrangement 15, in order to determine the first temperature $T_A$, close to the object, in addition to the second temperature sensor 9, close to the object, in order to determine the second temperature $T_I$, close to the object. The measurement in the form of the temperature $T_A$, $T_I$ and the above-mentioned test values may also be transmitted by a first radio module 23.1 of the above-mentioned radio arrangement 23 of the thermal transition sensor 30 to a second radio module 23.2 of the radio arrangement 23 in the measuring station 10.

The measuring station 10 itself comprises another temperature sensor 6, distant from the object, to determine the temperature $T_{ref}$, distant from the object, an electric imaging device 4 for the determination of the temperature distribution $T(x, y)$ in the measured form on a surface of the target object 100 and the distance-measuring device 2 to determine the distance D and/or set the focus length f and the pixel size $A_p$. This way, all measurements and test values shown in FIG. 4 may be forwarded to a computer 24, which according to the above-mentioned calculation rules for h (formula 6) and $Q_{out}$ (formula 2) may determine the entire thermal loss at the target object 100, according to the concept of one or more embodiments of the invention in a quantitatively reliable and at least approximately correct form.

Further, the measuring station 10 comprises in the housing 20 an output unit 26 in the form of a display. The display allows a suitable illustration of the temperature distribution $T(x, y)$ on the surface of the object in a calibrated form, e.g., with a false-color illustration. Furthermore, an input unit 25, such as a keyboard or the like, allows the input of values at the housing 20 of the measuring station 10, such as, e.g., one or more test values, unless they are not system-inherently saved.

Figure 5:
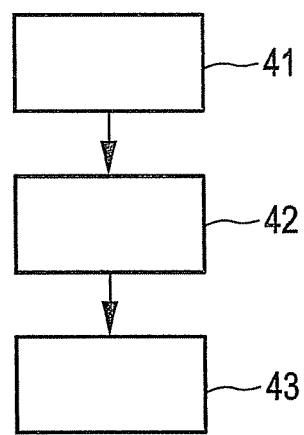
FIG. 5 a schematic illustration of a measuring method to measure the thermal output at a target object.

In order to implement the measuring process within the scope of the present embodiment, FIG. 5 shows a preferred sequence of the processing steps. In a first step 41 a measuring station 10 is arranged distanced from the target object 100 and an imaging record of the thermographic thermal image is prepared. The thermographic thermal image may be allocated to a temperature distribution $T(x, y)$ on the surface of the object via the illustration scale via pixels. Furthermore, a temperature $T_{ref}$, distant from the object, and the distance from the measuring object are measured to determine the imaging scale.

In a second step 42, at least one thermal transition sensor 30 is arranged close to the object at said target object 100 and a first temperature $T_A$ is measured close to the object. Furthermore, in this embodiment the above-mentioned test values and a second temperature $T_I$ are measured close to the object. Using the test values and the temperatures $T_A$, $T_I$ particularly the thermal transition coefficient h is determined. Additionally, the measured temperature distribution $T(x, y)$ is calibrated by equalizing $T_A$ and $T(x_0, y_0)$, i.e. the temperature at locations $(x_0, y_0)$ of the thermal transition sensor 30.

In a third step 43 the measurements and test values of the thermal transition sensor 30 or a number of thermal transition sensors 30 are transmitted to the measuring station 10, in order to provide them to a computer 24 in order to determine the entire thermal output at a surface of the target object 100.

The thermal output $Q_{out}$ may be determined by a computer 24, e.g., according to the above-mentioned rule of the formula 2 in the manner explained above, at least approximated, but reliably and with the elimination of convection errors.

Other calculation rules are explicitly possible within the scope of the concept of one or more embodiments of the invention; it shall be understood that the present exemplary embodiment only serves as an exemplary explanation of the concept of one or more embodiments of the invention for the use of an imaging thermographic measuring system 1000.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. An imaging thermographic measuring system for measuring a thermal output ($Q_{out}$) at a target object, said system comprising:
    a measuring station provided for an arrangement distant from an object, said measuring station including:
        an electric imaging device to record thermographic thermal images with a temperature distribution being allocated thereto; and
        a remote temperature sensor to measure a temperature ($T_{ref}$) distant from the object;
    at least one thermal transition sensor provided, to be arranged close to said object; and
    a transmission arrangement to transfer values from at least one thermal transition sensor and the measuring station, wherein said at least one thermal transition sensor is embodied to predetermine test values for the determination of a thermal transition coefficient (h).

2. The system of claim 1 wherein the thermal transition sensor comprises at least one of:
    at least one temperature sensor for measuring a first temperature ($T_A$) close to the object, and
    a thermal transition arrangement by which the test values to determine a thermal transition coefficient (h) may be predetermined.

3. The system of claim 1 wherein a computer is used to:
    calibrate the temperature distribution (T(x, y)) for values of at least one first temperature ($T_A$) close to the object,
    determine at least one thermal transition coefficient (h) via the test values, and
    quantitatively state a thermal output ($Q_{out}$), particularly at least with the use of the thermal transition coefficient (h), the calibrated temperature distribution (T(x, y)), and the temperature ($T_{ref}$) distant from the object as well as an imaging scale (M) of the thermoelectric image.

4. The system of claim 3 wherein said computer determines the thermal transition coefficient (h) at least via the test values, temperature ($T_{ref}$) distant from the object, and the first temperature ($T_A$) close to the object.

5. The system of claim 1 wherein the measuring station comprises a distance-measuring device using working beams for a touchless measurement of a distance (D) between a reference point and at least one measuring point (P) at the target object, particularly via sonar logging.

6. The system of claim 4 wherein the computer is embodied to determine the imaging scale (M) from the distance (D) and a focus length (f), particularly additionally via a pixel area ($A_P$) of the thermographic image.

7. The system of claim 1 wherein the thermal transition sensor comprises a test body and a temperature sensor is arranged to measure a first temperature ($T_A$) close to the object, at least on the front or back of the test body that may face the measuring station.

8. The system of claim 4 wherein said computer determines or presets the thermal transition coefficient (h) from the temperature ($T_{ref}$) distant from the object, the first temperature ($T_A$) close to the object, and the test values (K, ϵ, L, $q_I$, $T_I$), particularly at the front of the test body that may face the measuring station.

9. The system of claim 1 wherein the thermal transition sensor comprises a thermal transition arrangement with a test body such that test values may be predetermined and/or preset to determine a thermal transition coefficient (h) at the test body, with the test body comprising known test values of thermal conductivity (K) and thickness measurement (L), particularly, in addition thereto, thermal emissions (ϵ).

10. The system of claim 1 wherein the thermal transition arrangement of the thermal transition sensor further comprises a heat source with a known thermal flow density ($q_I$) at the back and/or inside of a test body which may face the target object.

11. The system of claim 1 wherein the thermal transition arrangement of the thermal transition sensor further comprises at least one other temperature sensor at least at the back and/or inside a test body, which may face the target object, to measure a second temperature ($T_I$) close to the object.

12. The system of claim 1 wherein a display unit illustrates the calibrated temperature distribution and/or an input unit to enter test values.

13. The system of claim 1 wherein the measuring station comprises a housing, in which at least the imaging device, the temperature sensor distant from the object, and a radio module of the transmission device are arranged.

14. The system of claim 1 wherein the thermal transition arrangement comprises an ultrasound measuring unit by which test values for the determination of a thermal transition coefficient (h) may be preset and/or determined.

15. An imaging thermographic measuring method to measure a thermal output ($Q_{out}$) at a target object, said method comprising:
    arranging a measuring station distant from an object and electrically recording images of a thermographic thermal image, to which a temperature distribution is allocated pixel-wise and the measuring of a temperature ($T_{ref}$) distant from the object;
    arranging at least one thermal transition sensor close to the object,
    performing at least one of:
        measuring a first temperature ($T_A$) close to the object; and
        predetermining test values in a thermal transition arrangement for determining a thermal transition coefficient (h) via the test values; and
    transmitting values between at least one thermal transition sensor and the measuring station.

16. The method of claim 15 further comprising:
    pixel-wise allocating of the thermographic thermal image to the temperature distribution under calibration thereof to values of at least one first temperature ($T_A$) close to the object,
    determining of a thermal transition coefficient (h) at least via the test values, and
    quantitative predetermining of a distribution of a thermal output ($Q_{out}$) by using the thermal transition coefficient (h), the calibrated temperature distribution, and the temperature ($T_{ref}$) distant from the object as well as an imaging scale (M) and the pixel size ($A_P$) of the thermo-electric image.

17. The method of claim 15 wherein the thermal transition sensor is detected by an imaging recording of the thermographic thermal image and the first temperature ($T_A$) close to the object is allocated to a pixel of the thermal image as a part of the temperature distribution.

18. The method of claim 15 further including at least one of:
   using the test value and at least the temperature distant from the object and the first temperature close to the object the thermal transition coefficient is determined, and
   using a known thermal flow density of a heat source ($q_I$) or a second temperature ($T_I$) close to the object at least at the back or inside of the test body that may face the target object.

19. The method of claim 15 wherein a distance (D) between a reference point and at least one measuring point at the target object is measured in a touchless fashion, particularly by sonar logging.

20. The method of claim 15 wherein the imaging scale (M) is determined from the distance (D), a focal length (f), and a pixel area ($A_P$).

* * * * *